Dec. 10, 1940.   W. H. VOGT   2,224,620
COMBINED CONTROLLING AND RECORDING DEVICE
Filed Dec. 1, 1939   3 Sheets-Sheet 1
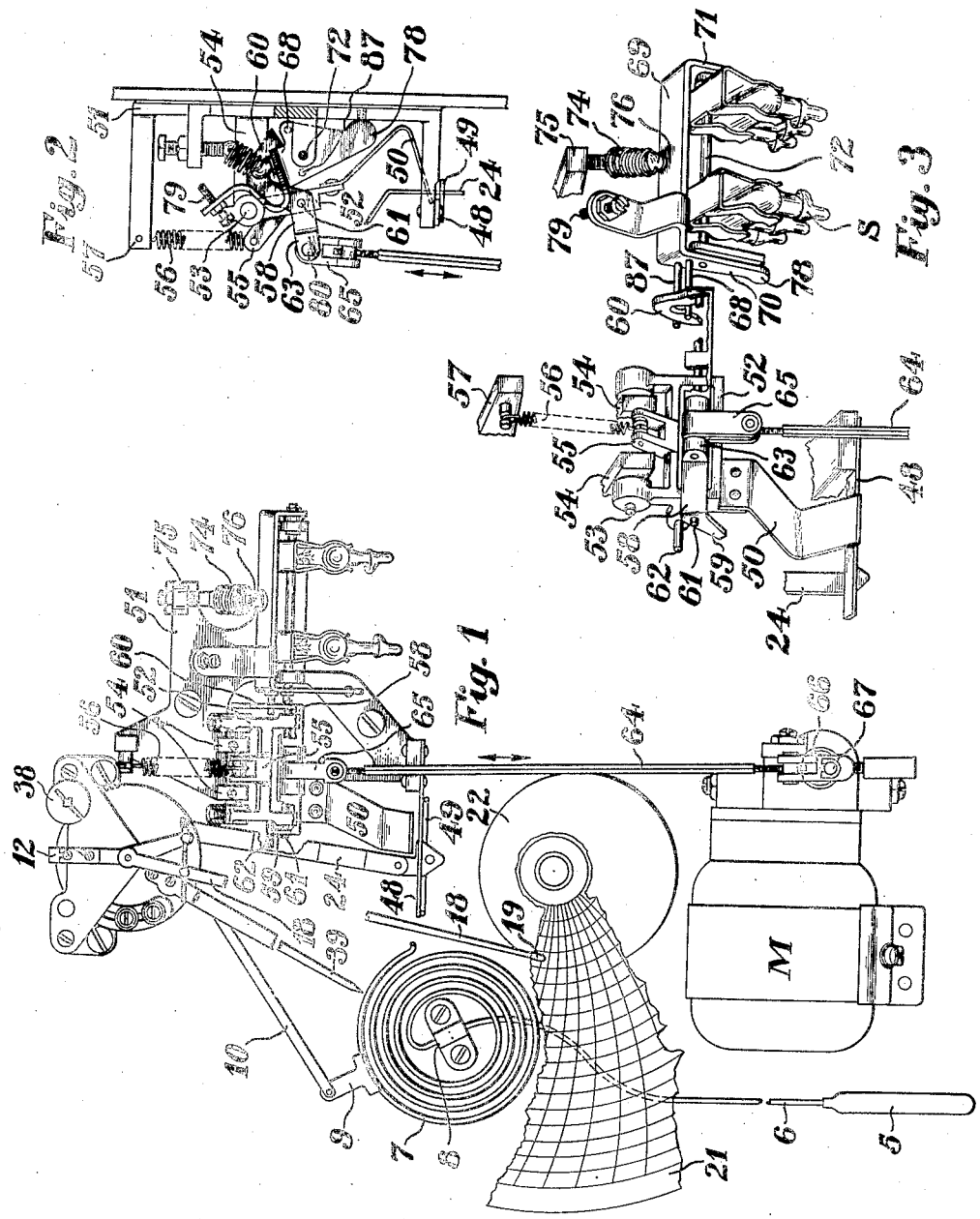
INVENTOR.
WILLIAM H. VOGT
BY
D. Clyde Jones
ATTORNEY.

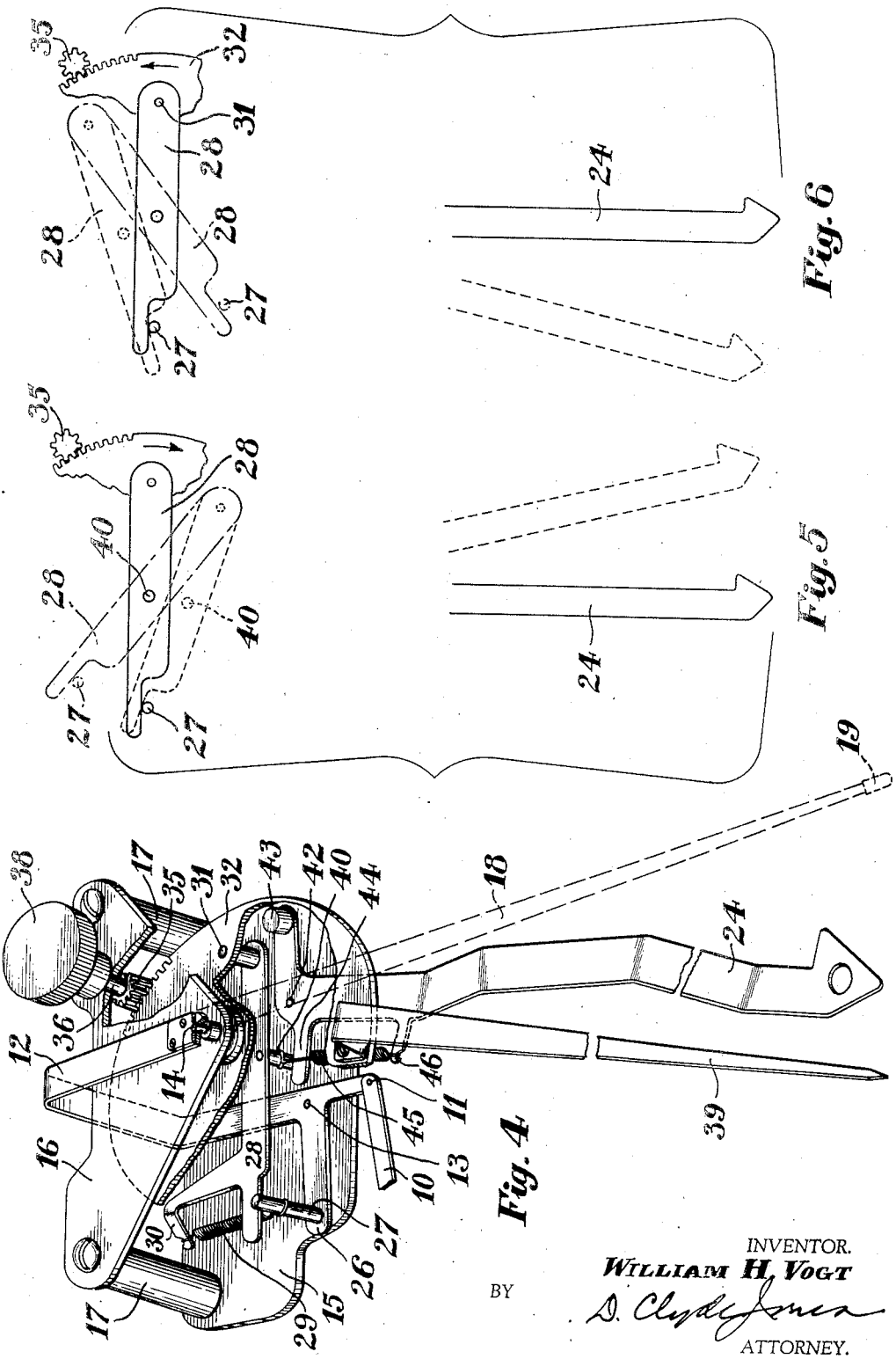

Dec. 10, 1940.  W. H. VOGT  2,224,620
COMBINED CONTROLLING AND RECORDING DEVICE
Filed Dec. 1, 1939  3 Sheets-Sheet 3
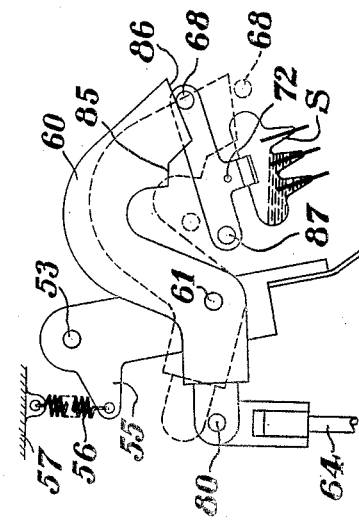
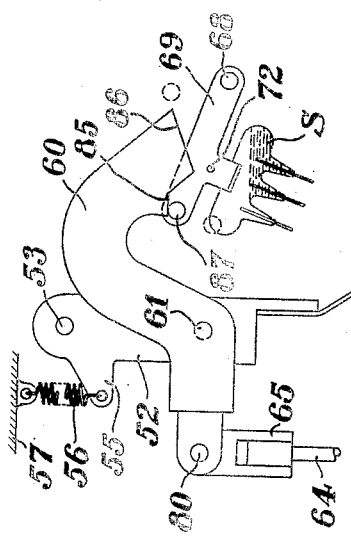
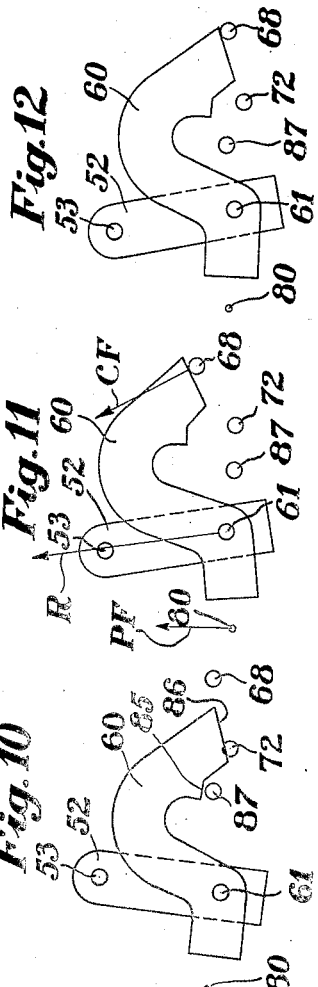
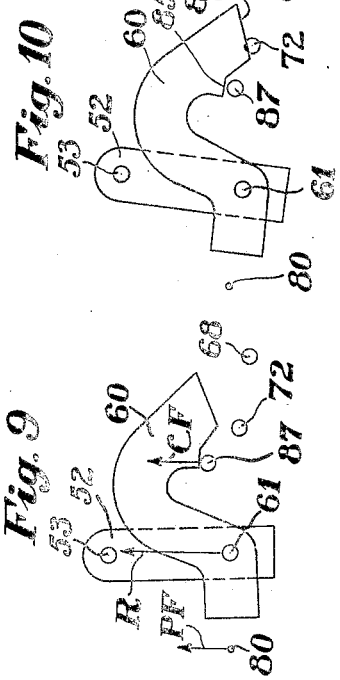
INVENTOR.
WILLIAM H. VOGT
BY D. Clyde Jones
ATTORNEY.

Patented Dec. 10, 1940

2,224,620

UNITED STATES PATENT OFFICE 2,224,620

COMBINED CONTROLLING AND RECORDING DEVICE

William H. Vogt, Rochester, N. Y., assignor to Taylor Instrument Companies, Rochester, N. Y., a corporation of New York Application December 1, 1939, Serial No. 307,139

10 Claims. (Cl. 74—1)

This invention relates to regulating devices and more particularly to combined regulating and recording devices. In various processes it is desirable to maintain a predetermined condition in which case it is the practice to sense automatically deviations from said condition and to open and close respectively a switch in response to such deviations so that a correcting medium may be introduced or cut off, as the case may be, to restore the condition to normal. Various arrangements have been proposed to effect this result, such as the device disclosed in the Widmer Patent No. 2,111,690.

The present invention has for its purpose a regulating device of relatively simple construction wherein there is negligible contact pressure between the sensing controller arms at the time of the tripping of the switch and wherein the sensing of the controller arm position and the tripping of the switch are effected at approximately the same time, whereas in former devices of this type the sensing of the controller arm position is effected during the exploring movement of the sensing arm and the tripping of the control switch is effected during the retrograde movement of this sensing arm.

Referring to the drawings Fig. 1 is a front view of the regulating and recording device of the present invention; Fig. 2 is a side elevation of a fragment of the device; Fig. 3 is a perspective view of a substantial portion of the operating mechanism of the device, certain parts thereof being broken away for clearness in disclosure; Fig. 4 is a perspective view of the controller arm operating mechanism and the mechanism for adjusting the set point or temperature at which the device will control; Figs. 5 and 6 are diagrammatic showings of two different adjustments of the mechanism of Fig. 5; Figs. 7 and 8 are side elevations of the sensing and switch operating mechanism under two different operating conditions; Figs. 9 and 10 are diagrams useful in describing the operating condition illustrated in Fig. 7; and Figs. 11 and 12 are diagrams useful in describing the operating condition illustrated in Fig. 8.

In the present disclosure the invention is utilized for maintaining a temperature at a predetermined value, although it will be understood that the invention is also applicable to maintaining at a given value, any variable condition such as changes in pressure, rate of flow, the level of liquid or the like.

Since the invention is disclosed as a temperature controlling and recording device, there is provided means for sensing deviations from a given temperature. The temperature sensing means is herein illustrated as a tube system which comprises a bulb 5, exposed to the medium the temperature of which is to be sensed and controlled, and a capillary tube 6 connecting the bulb with a Bourdon spring 7. This tube system may be filled with a liquid such as mercury, or may be filled with a liquid and its vapor, the latter type being known as a vapor-actuated tube system. The end of the Bourdon spring, which is connected to the capillary tube, is mounted on a fixed support 8, while the free end of this spring has a take-off fixture 9 fastened thereto. The take-off fixture is pivotally connected to one end of a link 10, the other end of which is pivotally connected at 11 to a U-shaped pen arm bracket 12, as best shown in Fig. 4.

The bracket 12 is rotatably supported about the spaced pins 13 and 14, respectively mounted in alinement on the base 15 and on the fixed mounting plate 16. As herein shown, the mounting plate, which is spaced from and parallel to the base, is secured on the upper ends of the posts 17 having their lower ends fastened to the base. The bracket 12 carries a pen arm 18 provided at its free end with a stylus 19 which draws a temperature graph on a circular chart 21, only a fragment of which is illustrated. This chart is rotated in accordance with time by a suitable clock mechanism generally indicated at 22.

The link 10 in addition to moving the pen arm bracket in accordance with the changing temperature also functions through certain mechanism to be described, to position a controller arm 24. The mechanism for moving the controller arm 24 by means of the link 10 comprises an extension 26 integral with the pen arm bracket 12. The extension is provided with a pin 27 projecting therefrom at right angles, into contact with the free end of a lever 28 which is held in contact relation with this pin by a coiled spring 29 respectively connected to the pin and to a lug 30 on the lever. This lever is pivoted at its other end to a pivot 31 on disk 32 which disk is rotatably adjustable about a bearing (not shown), on the plate 16 but which is positioned in alinement with the pins 13 and 14. For convenience in adjusting the disk 32, a portion of its periphery is provided with gear teeth which mesh with the teeth of a gear 35 provided on an arbor 36 journaled respectively in the base and in the plate. The arbor projects through the plate 16 and terminates in an adjusting knob 38. A set pointer 39 secured to the disk 32 and projecting radially therefrom, has its free end cooperating with the graduations on the chart to indicate the set point or temperature at which the instrument will control. It will be appreciated that as the knob 38 is turned, the arbor with its gear, rotates the disk which swings the set pointer to the appropriate position in registry with a desired temperature graduation on the chart.

It will be recalled that the lever 28 is pivoted at one of its ends on the disk 32 and is adjusted thereby. A pin 40 movable into alinement with the spaced pins 13 and 14, projects rearwardly from an intermediate point on this lever, to actuate a controller arm 24 pivoted at 42 on the base. If desired the controller arm may be provided with a counterweight 43. This arm has an extension 44 normally in contact with pin 40 being held in this relation by a coiled spring 45 having its ends respectively connected to pin 40 and to a lug 46 on said arm. The free end of the control arm travels in a guideway defined by a side edge of a fixed anvil 48 and by a guide loop 49 parallel to said edge (Figs. 1 and 2).

The controller arm 24 is thus movable responsive to temperature changes, into and out of engagement with a sensing arm 50. This sensing arm is periodically oscillated across the path of travel of the controller arm so that when the sensing arm is stopped by the controller arm, suitable switching mechanism is operated to one position and when the sensing arm is not stopped by the control arm the switching mechanism is actuated to its alternative position.

The sensing arm 50 is fixed on a generally U-shaped sensing arm bracket 52 pivotally mounted on a horizontal shaft 53 which is supported in parallel relation to the base on the uprights 54 projecting from the base 51. This bracket is provided with a lug 55 to which one end of the coiled spring 56 is secured, the other end of the spring being attached to a fixed upright or post 57 on the base. Thus the sensing arm is normally urged in a clockwise direction as viewed in Fig. 2.

A U-shaped selector bracket 58 provided with the rearwardly projecting stop arm 59 and selector arm 60 (Fig. 3) is pivotally mounted on a shaft 61 carried on the sensing arm bracket parallel to the shaft 53. The stop arm 59 on the selector bracket engages a pin 62 on the sensing bracket. The selector arm bracket is also provided with a lug 63 provided with a pivot 80 for a knuckle coupling 65 to which the upper end of a pitman rod 64 is connected. The lower end of this pitman rod is connected by a second knuckle coupling 66 (Fig. 1) to a crank 67 continuously rotated from the shaft of an electric motor M. By this arrangement the pitman rod 64 continually reciprocates, to swing the selector bracket 58 and since the stop arm 59 of this bracket normally engages the pin 62 on the sensing bracket 52 due to action of the coiled spring 56, these two brackets tend to swing as a unit about the shaft 53 as a first axis, against the action of the coil spring 56. When, however, the travel of the sensing arm 50 is stopped by its engagement with the controller arm 24, then the forward movement of the sensing bracket is blocked but the forward swinging movement of the selector bracket 58 is continued about the shaft 61 as a second axis.

The rearwardly extending selector arm 60 of the selector bracket 58 as best shown in Figs. 7 and 8, is provided with two cam surfaces 85 and 86 which respectively engage pins 87 and 68 on a U-shaped switch support 69 depending on which of said axes determine the swinging movement of the selector bracket. The arms 70 and 71 of this switch support are mounted on a horizontal shaft 72 extending in a direction generally parallel to the shafts on which the mentioned sensing selector brackets are mounted. The mentioned pins 87 and 68 are secured on the arm 70 of the switch support on opposite sides of the principal axis of the shaft 72. Thus when one pin is forced downward, the switch support will be rotated in one direction, whereas when the other pin is forced downward the switch support will be rotated to the opposite direction. The switch support carries one or more electric switches S, preferably of the mercury-bottle type. Since it is desirable that the switch support move the mercury switches by a snap action to their respective open and closed positions, a coil spring 74 is provided having one end attached to a fixed post 75 on the base and its other end connected to a knob 76 on the switch support, being so positioned that the spring will hold the switch support in either of its two positions after the support has been moved past its dead center. It will be understood that the limit of rotation of the switch support in its two directions of motion are respectively determined by the contact of the stops 78 and 79 with the base of the instrument.

In the operation of the instrument, the bulb 5 is exposed to the medium, the temperature of which is to be sensed and controlled. Also the motor M is started in operation to continuously oscillate the selector and sensing brackets. It will be understood that the set pointer 39 is in registry with the chart graduation corresponding to the desired temperature to be maintained in the medium by the device. Let it be assumed that the temperature of the medium is above the desired value and therefore the controller arm 24 is out of the path of the oscillating sensing arm 50. Also that the switches S are in a position to actuate the means to decrease the temperature of the medium. As the motor continues to rotate it operates through the crank 67 to reciprocate the pitman 64 regularly. It will be recalled that the pitman is connected through the knuckle coupling 65 to the selector bracket 58 so that this bracket is alternately moved forwardly and rearwardly with respect to the base of the instrument. Since the controller arm, under the condition assumed, is out of the path of the sensing arm, the pin 62 on the sensing bracket is normally held by the spring 56 in contact with the stop arm 59 on the selector bracket. Thus both of these brackets will be oscillated as a unit about the shaft 53 as an axis, so that the cam surface 85 and 86 move in arcs having given radii about the shaft 53 as a center. In this way unit oscillation of these brackets continues as long as the temperature of the medium is above the desired value.

Since the switches S are in a position to actuate means which decreases the temperature of the medium, the fluid in the bulb 5 and the remainder of the tube system gradually contracts causing the Bourdon spring 7 to wind up. The winding up of this spring moves the take-off 9 toward the right (Fig. 1) which motion, in turn, causes the link 10 also to move toward the right (Figs. 1 and 4). The link 10 since it is pivotally connected to the pen arm bracket, swings this bracket and the pen arm carried thereby in a counterclockwise direction about the alined pins 13 and 14 as an axis. In this way the stylus 19 on the pen arm continues to draw a graph on the chart 21 corresponding to the temperature prevailing at the bulb 5. As the pen arm bracket thus swings counterclockwise it also tends to swing the pin 27 on the bracket extension 26 away from the free end of the lever 28, but the spring 29 swings the lever counterclockwise about its pivot 31. The pin 40 on the lever 28 forces the extension 44 of the controller arm in a direction to swing this arm also in a counterclockwise direction. Thus the free end of the controller arm is gradually moved in its guideway in a direction tending to advance it into the path of the oscillating sensing arm 50. Eventually the fall in temperature will operate the means already described to bring the controller arm into the path of the oscillating sensing arm. On the first forward oscillation of the selector bracket after this takes place, the selector bracket 58 and the sensing bracket 52 resiliently connected thereto, will start to swing about the shaft 53 until the sensing arm 50 engages the rear surface of the controller arm 24. When this takes place, the forward motion of the sensing arm 50 will be stopped but the pitman will continue the oscillation of the selector bracket 58 although from this point the remainder of the mentioned oscillation will be effected about the shaft 61 as an axis. In this instance the cam surfaces 85 and 86 move about shaft 61 as a center in arcs having radii of different lengths from those first mentioned. This change in the axis about which the selector bracket now moves, brings the cam surface 86 on the selector arm 60 of this bracket so that in the course of the further movement thereof, this cam surface engages the pin 68 on the switch support and moves this support toward its alternate position where it is held by the coil spring 74. With the switch thus actuated, mechanism (not shown) controlled by switch is operated to increase the temperature of the medium. As the temperature of the medium rises, fluid in the bulb 5 and the remainder of the tube system gradually expands causing the Bourdon spring 7 to unwind. The unwinding of this spring moves the take-off 9 toward the left (Fig. 1) which, in turn, moves the link 18 toward the left (Fig. 1). The link 10 since it is pivotally connected to the pen arm bracket 12 swings this bracket and the pen arm 18 carried thereby in a clockwise direction about the alined pins 13 and 14 as an axis. Thus the stylus 19 continues to draw the temperature graph on the chart 20 to record the rising temperature at the bulb 5.

It will be understood that while the temperature of the medium is below the desired or control temperature, the controller arm 24 will remain in the path of the sensing arm 50, thereby intercepting the forward movement of this sensing arm. Under this condition the selecting bracket will complete the major portion of its oscillation about the shaft 61. Since pins 87 and 68 on the switch support have previously been moved to the dotted position shown in Fig. 8, the cam surfaces 85 and 86 on the selector arm 60 are both oscillated about the shaft 61 in a path clear of the mentioned pins.

When the temperature of the medium rises just above the desired value or control point, the right hand edge of the controller 24 will be just out of the path of the sensing arm 50 so that this sensing arm can make a complete excursion about the shaft 53 as an axis. Under this condition the selector arm 60 will be operated to throw the switch support to its alternate position, since the cam surface 85 on the selector arm now engages the switch operating pin 87, as shown in Fig. 7.

In prior instruments of this type, it has been found that right hand edge of the controller arm 24 and the left hand edge of the sensing arm 50, as viewed in Fig. 1, become worn in use. It will be understood that any change in the contour of the mentioned edges will introduce an error in the resulting temperature regulation. The mentioned wear in prior devices results from the heavy contact pressure between the sensing arm and the controller arm at the time of tripping the switch support 69. The present invention provides an instrument of this type in which the mentioned contact pressure is reduced to a negligible amount, thereby insuring minimum wear on the parts in question. This negligible contact pressure arises from the fact that the force PF (see Figs. 9 and 11) of the pitman, necessary to trip the switch support to its various positions, and the force CF exerted by selector arm cam surfaces on a given pin of the switch support, give rise to a resultant force R which substantially passes through the centers of both shafts 53 and 61, or slightly to the rear of shaft 61. Thus this resultant affects only the mentioned shafts and substantially no force is reflected back to the sensing arm to develop contact pressure against the controller arm. In fact, in certain of the tripping positions, there is actually a small withdrawal of the sensing arm from the controller arm.

It has been mentioned that the control point of the instrument is changed by turning the adjusting knob 38. This results in rotating the disk 32, as well as the pointer 39, until this pointer registers with the desired temperature graduation on the chart 21, and also causes the controller arm to swing either clockwise or counterclockwise as the case may be.

If the knob 38 is rotated counterclockwise the pointer 39 will be swung clockwise and the controller arm 24 will swing in a counterclockwise direction, as illustrated in Fig. 5. It will be noted that the controller arm and the lever 28 at the end of the adjustment will assume the positions illustrated in dotted lines in this figure. In this adjustment it will be understood that the instrument will not be at the control point until the pin 40 on the lever 28 is in alinement with the axis through the pins 13 and 14, as is illustrated by broken line showing of this lever in the mentioned figure. It will be remembered that these pins are the pivots about which the pen arm rotates. Similarly, when the control point is lowered by turning the knob 38 in a clockwise direction, the controller arm 24 and the lever 28 will assume positions illustrated in dotted lines in Fig. 6. The broken line position of lever 28 in this figure shows the position of this lever when the instrument is at the control point. The pin 40 on lever 28 is thus always in alinement with the axis through the pins 13 and 14, when the control or set point temperature is reached, irrespective of the adjustment of the set pointer 39. This insures that the controller arm, when at the control point will always occupy the same position with all adjustments of the set pointer 39. Thus there will be no error such as would result if the controller arm assumed a different angular position with each adjustment of the set pointer.

I claim:

1. In a device of the class described, a fixed support, a member mounted on said support for rotary adjustment about a given center, a pivot on said member, a lever having one end supported on said pivot, the other end of said lever being movable in accordance with a condition to be controlled, a controller arm movable about a pivot parallel to said first pivot, and means on said lever for operating said controller arm, said means being movable in an arc intersecting said given center.

2. In a device of the class described, a pen arm bracket movable about a given axis, means for operating said bracket, a controller arm movable about an axis parallel to said given axis but spaced therefrom, means including a lever for moving said controller arm in accordance with said pen arm bracket movements, said lever having one end adjustable in an arc of fixed radius about said given axis as a center, a pin on an intermediate portion of said lever, said pin extending in a direction parallel to said given axis and being movable in an arc intersecting said given axis, the other end of said lever being actuated by said pen arm bracket, and means including said pin for operating said controller arm.

3. In a device of the class described, a controller arm oscillatable about a fixed pivot, a pin arm bracket oscillatable about a given axis parallel to the axis of said fixed pivot, means responsive to a deviation in a condition for operating said pen arm bracket, a set pointer and a support therefor rotatably adjustable about said axis as a center, a lever pivoted at one end on said support, said lever being provided at an intermediate point thereon with a part movable into substantial registry with said given axis, means including said pen arm bracket for moving the other end of said lever, and means including said part for moving said controller arm.

4. In a device of the class described, a controller arm movable in accordance with deviations in a condition, a selector arm mounted to oscillate about a fixed pivot and a floating pivot, a motor for periodically oscillating said selector arm, an oscillating sensing arm having two different ranges of movement depending on its contact with or absence of contact with said controller arm, means including said sensing arm for determining about which of said pivots the selector arm oscillates, and means selectively controlled by the respective oscillations of said selector arm.

5. In a device of the class described, a base, a controller arm on said base to oscillate in a given plane, means for operating said arm in accordance with deviations in a condition, a sensing arm bracket pivoted on said base, said bracket being provided with a sensing arm having a retrograde movement and an exploring movement intersecting said plane, said exploring movement having two different ranges of movement depending on the contacting of said sensing arm with said controller arm or the absence of contact therebetween, a selector arm bracket pivotally mounted on said sensing arm bracket to have an exploring movement and a retrograde movement, said selector arm bracket being provided with a selector arm means including said selector arm bracket for moving said sensing arm in its exploring and retrograde movements, and means selectively actuated by said selector arm during its exploring movement.

6. In a device of the class described, a controller member movable in a given plane in response to a deviation in a condition to be controlled, a sensing arm oscillated in a path intersecting said plane, said sensing arm having two different ranges of movement depending on its contact with or absence of contact with said controller arm, a selector arm provided with two different cam surfaces in off-set relation to each other, means for moving each of said cam surfaces in arcs of different radii depending upon the range of movement of said sensing arm, and means selectively actuated by the respective cam surfaces dependent on the radius of the arc in which they move.

7. In a device of the class described, a controller member movable in a given plane in response to a deviation in a condition to be controlled, a sensing arm oscillated in a path intersecting said plane, said sensing arm having two different ranges of movement depending on its contact with or absence of contact with said controller arm, a selector arm provided with two different cam surfaces in off-set relation to each other, means for moving each of said cam surfaces in arcs of different radii depending upon the range of movement of said sensing arm, and means selectively actuated by the respective cam surfaces, one cam surface being effective when said surfaces are moved in arcs having given radii and the other cam surface being effective when said surfaces are moved in arcs having other radii.

8. In a control mechanism, a condition responsive device including a movable controller arm, a sensing arm movable in a path intersecting the path of movement of said controller arm and having two different ranges of movement depending upon its contact with or absence of contact with said controller arm, a selector arm movable about two spaced parallel axes, a motor for periodically oscillating said selector arm, means including said sensing arm and controlled by the range of movement thereof for determining about which of said axes said selector arm moves, and means selectively operated dependent on the respective movements of said selector arm.

9. In a control mechanism, a condition responsive device including a movable controller arm actuated in accordance with a deviation in a condition to be controlled, a bracket provided with a sensing arm movable about an axis in a path intersecting the path of movement of said controller arm, said sensing arm having two different ranges of movement depending on its contact with or absence of contact with said controller arm, a selector bracket provided with a selector arm, said selector bracket being mounted on said first bracket to move about a second axis in the same direction as said first bracket, means normally causing said selector bracket and said first bracket to move as a unit, a motor for periodically oscillating said selector bracket and its selector arm, means including said sensing arm and controlled by the range of movement thereof for determining about which of said axes said selector arm moves, and means selectively operated depending on the respective movements of said selector arm.

10. In a control instrument, a condition responsive device including a movable controller arm actuated in accordance with a deviation in a condition to be controlled, a pivoted bracket provided with a sensing arm movable in a path intersecting the path of movement of said controller arm, said sensing arm having two different ranges of movement depending on its contact with or absence of contact with said controller arm, a selector bracket pivoted on said first bracket to move in the same direction as said first bracket, a selector arm provided on said selector bracket, a motor for periodically oscillating said selector bracket and its selector arm, means including said sensing arm and controlled by the range of movement thereof for determining about which of said pivots said selector arm moves, and mechanism selectively operated by said selector arm depending on the respective movements of said selector arm, the force applied to said selector arm by said motor and the force applied to said selector arm due to the actuation of said mechanism developing a resultant force effective along a line passing substantially through said pivots.

WILLIAM H. VOGT.